UNITED STATES PATENT OFFICE.

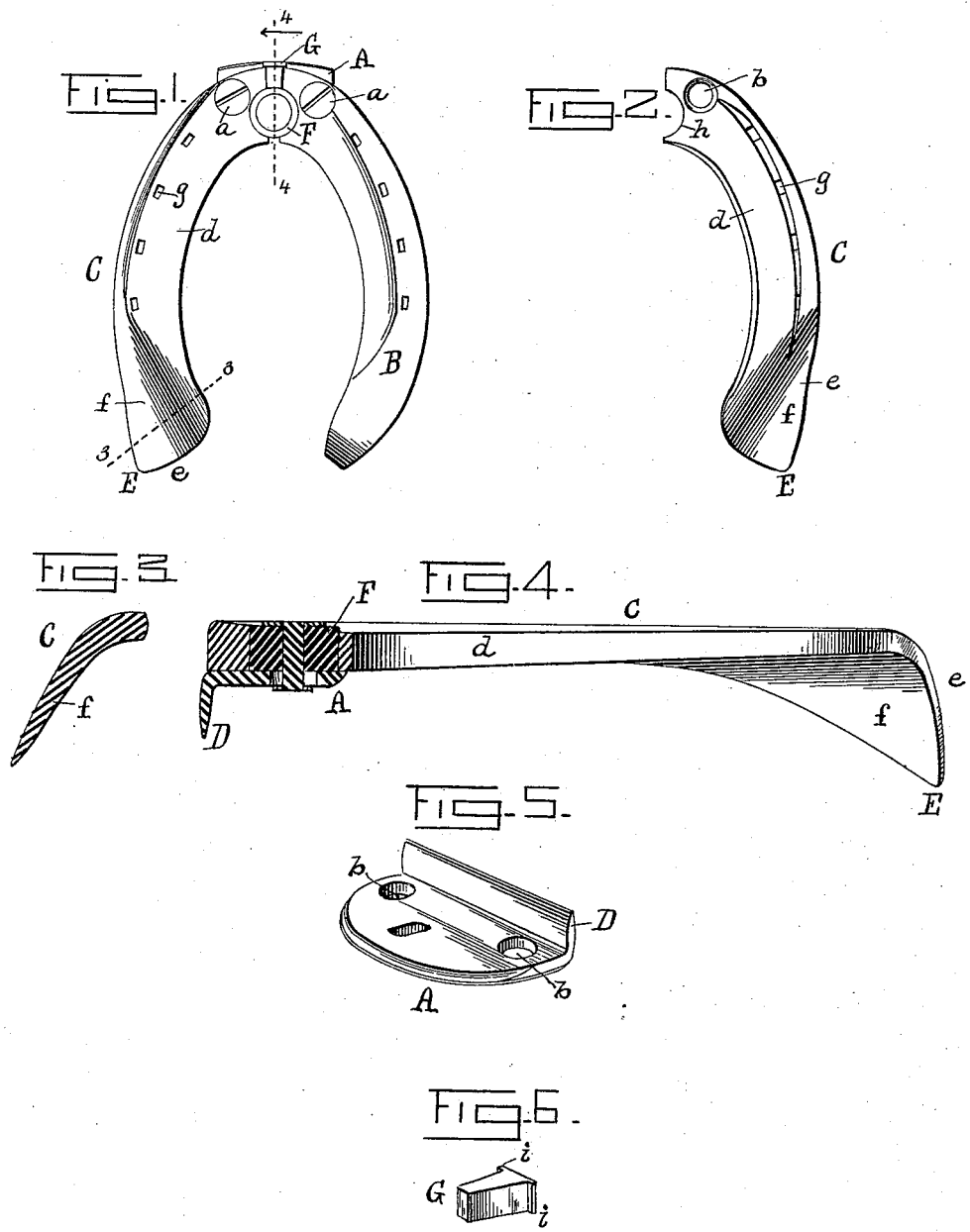

WILLIAM W. HALLENBECK, OF LEON, NEW YORK.

HORSESHOE.

SPECIFICATION forming part of Letters Patent No. 326,290, dated September 15, 1885.

Application filed April 11, 1885. (No model.)

*To all whom it may concern:*

Be it known that I, WILLIAM W. HALLENBECK, a citizen of the United States, residing at Leon, in the county of Cattaraugus and State of New York, have invented certain new and useful Improvements in Horseshoes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of horseshoes which are designed to be used on horses which have contracted hoofs, the object of the shoes being to expand the hoof. In shoes of this class the two sides of the shoe are separate pieces, and are usually pivoted directly together or to a separate toe-piece. The methods usually adopted, in connection with shoes of this class, for expanding the hoofs are either to use a spring in connection with the two sections of the shoe, which exerts a constant pressure in the direction of desired expansion, or to connect the two sections by an adjustable rod, which holds the parts in rigid position, the sections being forced apart by adjusting the rod, thus forcing by direct means the expansion of the hoof. There are a number of objections to both of these classes of shoes, among which may be mentioned that they force the hoof to expand positively, thereby frequently injuring the hoof and rendering the horse lame, and that they do not provide for those numerous cases where the hoof is contracted on one side only.

In another class of shoes for hoof-bound horses the expansion of the hoof is effected by beveling or curving outwardly and downwardly the upper surface of the shoe, upon which surface the hoof naturally tends to expand, and to this class of shoes my invention relates.

The construction of my improved shoe provides for those cases where only one side of the hoof is contracted; and my invention consists in the detailed construction hereinafter more specifically set forth.

In the drawings, Figure 1 is a top view of a shoe embodying my improvements, showing a shoe to be used where one side only of the hoof is contracted. Fig. 2 is a bottom view of one side detached. Fig. 3 is a vertical section in a plane indicated by the line 3 3, Fig. 1. Fig. 4 is a vertical section in a plane indicated by the line 4 4, Fig. 1. Fig. 5 is a detail view of the toe-piece, and Fig. 6 is a detail view of the wedge. Figs. 3, 4, 5, and 6 are drawn to a larger scale than Figs. 1 and 2.

The shoe consists of a toe-plate, A, and side sections, B and C, which are pivoted to the toe-plate. The side sections, B and C, are preferably pivoted to the toe-plate by bolts $a$ $a$, which pass through holes $b\ b$ in the side sections and toe-plates, and are secured by nuts on the under side of the toe-plate. The toe-plate is formed with a calk, D, which is shown as being a sharp or ice calk.

Of the side sections, B and C, the section B is made like the similar part in an ordinary shoe, but the section C is formed in accordance with my improvements. In case the hoof is contracted on both sides, it will be understood that both sections will be formed like the section C. The section C may be considered as made up of two parts—a toe part, $d$, and a heel part, $e$, each comprising about one-half of the length of the section. The upper inner portion of the heel part $e$ is flat, and in the same plane with the rest of the upper surface of the shoe; but its outer portion, $f$, curves downward and outward, forming a curve approximating the arc of a circle. The toe part $d$ is flat or slightly concave on its upper inner surface, and is provided with nail-holes $g\ g$, and on the portion without the nail-holes is or may be curved outward and downward slightly. At the point where the heel part joins the toe part its flat surface is of the width of the toe part, but from this point backward the proportion of the curved part increases regularly until at the extreme end of the heel part the downward curve commences at the inner edge and extends the entire width of the section. The under surface of the section C curves in a manner corresponding with the upper surface. From the point where the outward curve commences the outer edge of the shoe inclines downward to form a sharp calk, E, and at the same time the section decreases in thickness from the inner to the outer edge, thus forming a sharp-pointed calk. This construction of the heel portion renders it elastic under the weight of the horse, and thus renders the shoe easy to wear, and the curved under surface prevents the lodgment of any snow or mud on the under side of the shoe.

The joints between the sections of the shoe and the toe-plate are not perfectly tight, but allow a slight vertical play of the sections, so that the shoe may be easily fitted to the hoof.

In fitting a horse to be treated with this shoe the shoe is applied so that the flat bearing-surface at the heel rests on the frog and bar of the hoof, and the shoe is then nailed on. Thus applied there is no pressure from the shoe on the outer portion of the horse's heel, and the tendency of the heel, not being supported, is to spread out over and down the curved surface $e$. This the hoof does naturally by ordinary use and travel, and as the hoof expands, the joint at the toe permits an expansion of the shoe to follow that of the hoof.

By the use of this shoe the worst cases of contracted hoof can be thoroughly and completely cured in the course of three or four months without any direct force being applied, and without any danger to the horse under treatment.

To hold the sections in proper relative position while the shoe is being applied, and to provide against any lateral looseness of the joints during the use of the shoe, I provide a rubber washer, F, which is secured to the toe-plate A between the two sections. To admit the washer, which is preferably circular in form, the sections are cut away, as at $h$. This rubber washer, although tending to press the sections apart, exerts but little pressure, and does not exert any perceptible pressure upon the hoof.

It is found in the use of all sectional shoes that in case of fast trotting, or in traveling on hard roads, they are not rigid enough, and to provide for such cases I provide a device which can readily be applied when a rigid shoe is desired, and can be readily removed when not desired, so that the curative function of the shoe can be continued. For this purpose I provide a wedge-shaped piece, G, which is inserted above the toe-plate between the adjacent faces of the sections. As the sections at this point are being constantly pressed toward each other by the weight of the horse, there is no danger of the wedge-piece falling out, and its wedge shape enables it to be used throughout the entire period of treatment. To enable it to be easily withdrawn when not needed, I make it with flanges $i\ i$ at its end, which permit a firm grasp to be obtained upon it.

I claim as my invention—

1. In a sectional horseshoe for hoof-bound horses, a pivoted section, the heel portion of which is bent outwardly and downwardly and sharpened to form a heel-calk, the upper surface of said heel portion having a downward and outward curve upon which the hoof may spread, and the lower surface being curved in a similar manner, substantially as set forth, whereby elasticity of the shoe is secured and the lodgment of foreign matters beneath the hoof is prevented.

2. In a sectional horseshoe for horses whose hoofs are contracted on one side only, a toe-plate, in combination with two sections pivoted thereto, one of said sections having a flat upper surface throughout its entire length, and the other section having the upper surface of its heel portion curved downwardly and outwardly, substantially as set forth.

3. In a sectional horseshoe, a toe-plate and two sections pivoted thereto, in combination with an elastic cushion or washer secured to said toe-plate between the adjacent ends of said sections, substantially as set forth.

In testimony whereof I affix my signature in presence of two witnesses.

WILLIAM W. HALLENBECK.

Witnesses:
 FRANK D. CANNON,
 EDGAR A. COOPER.